(12) United States Patent
Roach et al.

(10) Patent No.: US 7,723,941 B2
(45) Date of Patent: May 25, 2010

(54) SYSTEM AND METHOD OF COMMAND SIGNAL CONDITIONING IN HIGH RESPONSE SYSTEMS

(75) Inventors: Jeffrey M. Roach, St. Charles, MO (US); Steven H. Degroote, Creve Coeur, MO (US)

(73) Assignee: The Boeing Company, Chicago, IL (US)

( * ) Notice: Subject to any disclaimer, the term of this patent is extended or adjusted under 35 U.S.C. 154(b) by 1910 days.

(21) Appl. No.: 10/748,001

(22) Filed: Dec. 29, 2003

(65) Prior Publication Data

US 2005/0141422 A1 Jun. 30, 2005

(51) Int. Cl.
*G05B 19/29* (2006.01)
(52) U.S. Cl. .................. 318/600; 318/560; 388/801
(58) Field of Classification Search .......... 318/600, 318/560; 388/801; 370/232
See application file for complete search history.

(56) References Cited

U.S. PATENT DOCUMENTS

| | | | | |
|---|---|---|---|---|
| 5,455,495 A | | 10/1995 | Bec | |
| 5,701,284 A | * | 12/1997 | Lee | 369/47.44 |
| 5,852,681 A | | 12/1998 | Amaratunga et al. | |
| 6,453,331 B1 | | 9/2002 | Burton et al. | |
| 6,771,894 B2 | * | 8/2004 | Smith | 388/809 |
| 7,039,559 B2 | | 5/2006 | Froehlich et al. | |
| 7,047,310 B2 | * | 5/2006 | Bedekar et al. | 709/232 |
| 2001/0043288 A1 | * | 11/2001 | Smith | 348/743 |

* cited by examiner

*Primary Examiner*—Bentsu Ro
*Assistant Examiner*—David S Luo
(74) *Attorney, Agent, or Firm*—Harness, Dickey & Pierce, P.L.C.

(57) ABSTRACT

A system and method of command signal conditioning in high response systems is disclosed. The system includes a central digital controller having a digital controller frame rate, a motor, a motor controller in communication with the digital controller and the motor, the motor controller having a motor controller frame rate higher than the digital controller frame rate, and a signal conditioner adapted to condition the command signal to produce a modified command signal at the motor controller frame rate. The signal conditioner is preferably implemented in software. In one embodiment, the signal conditioner is adapted to calculate a moving average at the frame rate of the motor controller. In another embodiment, the signal conditioner comprises a first order hold and a filter in communication therewith. A method of command signal conditioning in accordance with the foregoing is also disclosed.

21 Claims, 7 Drawing Sheets

SYSTEM AND METHOD OF COMMAND SIGNAL CONDITIONING IN HIGH RESPONSE SYSTEMS

This disclosure was developed in the course of work under U.S. government contract MDA972-99-9-0003. The U.S. government may possess certain rights in the disclosure.

BACKGROUND

The present disclosure is directed to an improved control system and method and in particular, to a system and method for command signal conditioning in high response systems.

Modern electrically powered motion control systems rely on digital control for operation. Typically, such systems consist of a central digital controller which communicates with one or more motors via corresponding digital motor controllers. The computation or frame rate of the central controller is often much lower than the frame rate of the motor controller. As a result, when the motor controller is highly responsive, the coarse step commands from the central controller can cause significant electrical current oscillations. This in turn can result in wasted energy and increased heat generation.

Existing low frequency-to-high frequency response systems handle excess heat generation by either adding a cooling system or in the case where one already exists, increasing the size or capacity of the existing cooling system, if possible. Waste energy is typically handled by increasing the size of the power generation system and wiring. In applications involving size or weight constraints, such as in aerospace systems, these solutions are often not acceptable. Such solutions also significantly increase the overall cost and maintenance of the system.

Moreover, any solution to heat generation and waste energy problems must not adversely impact on the phase shift of the system so that the desired response can be maintained. This is especially true in high response systems requiring precise positioning.

The present disclosure overcomes the foregoing limitations. In accordance with the present disclosure, the need for a cost-effective control system and method which reduces waste energy and heat generation and minimally affects the size, weight and response of the system is fulfilled.

SUMMARY

A control system having a central digital controller having a digital controller frame rate and a command signal, a motor, and a motor controller in communication with the central digital controller and the motor, the motor controller having a motor controller frame rate higher than the digital controller frame rate is disclosed. The control system comprises a signal conditioner adapted to condition the command signal so as to generate a modified command signal at the motor controller frame rate. The signal conditioner comprises a computer readable medium having computer readable program code embodied thereon.

In one embodiment, the computer readable code, when executed, calculates a moving average at the frame rate of the motor controller, such that the modified command signal is an interpolation of the command signal over a plurality of frames. In another embodiment, the signal conditioner comprises a first order hold and a filter in communication with the first order hold. The first order hold comprises a linear extrapolation of the command signal of the digital controller over a plurality of frames. The filter may comprise a first order filter having a breakpoint which is selected to negate any high frequency gain increase introduced by the first order hold. In one embodiment, the linear extrapolation comprises the use of the last two command signals of the digital controller and has a starting point being the most recent command signal of the digital controller. The computer readable medium may be stored on the motor controller.

An apparatus comprising a computer readable medium having computer readable program code embodied thereon is also disclosed. The computer readable program code, when executed, implements on a computer a method of conditioning a command signal generated by a central digital controller having a digital controller frame rate prior to its application to a motor controller having a motor controller frame rate higher than the digital controller frame rate. The method modifies the command signal to produce a modified command signal at the motor controller frame rate.

In one embodiment, the method of conditioning comprises calculating a moving average at the frame rate of the motor controller such that the modified command signal is an interpolation of the command signal over a plurality of frames. In another embodiment, the method of conditioning comprises linearly extrapolating the command signal from the digital controller over a plurality of frames and filtering the linearly extrapolated command signal.

A control system comprising a central digital controller having a command signal and a digital controller frame rate, a motor controller having a motor controller frame rate higher than the digital controller frame rate, and a signal conditioner adapted to condition the command signal to produce a modified command signal at the motor controller frame rate is also disclosed. The signal conditioner comprises a computer readable medium having computer readable program code embodied thereon. In one embodiment, the computer readable code, when executed, calculates a moving average at the frame rate of the motor controller such that the modified command signal is an interpolation of the command signal over a plurality of frames. In another embodiment, the signal conditioner comprises a first order hold, and a filter in communication with the first order hold. The first order hold comprises a linear extrapolation of the command signal over a plurality of frames. The filter may comprise a first order filter having a breakpoint which is selected to negate any high frequency gain increase introduced by the linear extrapolation. The linear extrapolation may comprise the use of the last two command signals of the digital controller and has a starting point being the most recent command signal of the digital controller. The computer readable medium is preferably stored on the motor controller.

A method of conditioning a command signal generated by a central digital controller having a digital controller frame rate prior to its application to a motor controller having a motor controller frame rate higher than the digital controller frame rate is also disclosed. The method comprises conditioning the command signal to produce a modified command signal at the motor controller frame rate. In one embodiment, the step of conditioning comprises interpolating the command signal over a plurality of frames and in particular, calculating a moving average at the frame rate of the motor controller. In another embodiment, the step of conditioning comprises linearly extrapolating the command signal of the digital controller over a plurality of frames, and filtering the linearly extrapolated command signal. The step of filtering may comprise selecting a breakpoint to negate any high frequency gain increase introduced by the step of linear extrapolation.

Further features and advantages of the present disclosure, as well as the structure and operation of various embodiments of the present disclosure, are described in detail below with reference to the accompanying drawings.

DETAILED DESCRIPTION OF THE EMBODIMENTS

Figure 1:
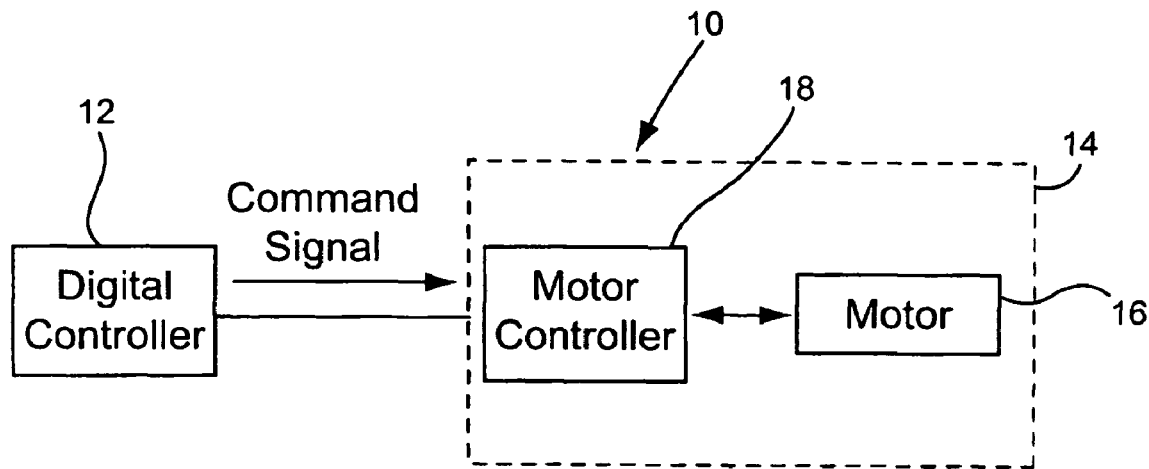
FIG. 1 is a block diagram of a portion of a motion control system in accordance with the present disclosure.

The present disclosure is directed to an improved control system and method. While the system 10 will be described with respect to a motion control system, it can be appreciated that it can be applied to any high response system. The system 10, a portion of which is shown in FIG. 1, typically comprises a central digital controller 12 which controls one or more actuator systems 14. Each actuator system 14 includes among other things an electric motor 16 and a digital motor controller 18 for control thereof. The central controller 12 generates an input or command signal which is transmitted to the appropriate motor controller 18 and conditioned in accordance with the present disclosure.

Figure 2:
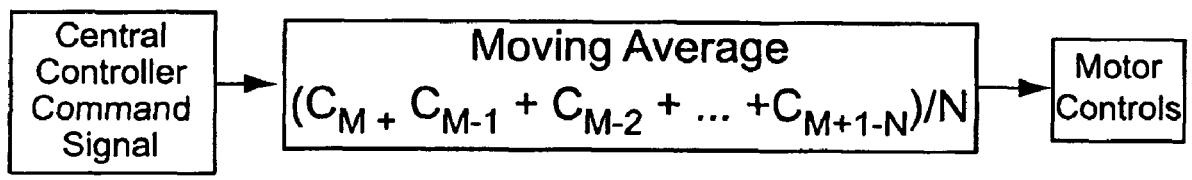
FIG. 2 is a block diagram of a method of command signal conditioning in accordance with one embodiment of the present disclosure.

Conditioning of the command signal is accomplished by using the lower rate data from the central controller 12 to produce a modified command signal at the frame rate of the motor controller 18. In one embodiment as shown in FIG. 2, conditioning of the command signal involves interpolation of the command signal over a plurality of frames and in particular, calculating a moving average at the frame rate of the motor controller 18 and adjusting the command signal of the central controller 12 accordingly. This approach will be hereinafter referred to as the moving average approach. While this approach is preferably implemented in software residing on the motor controller 18, it can be appreciated that it can be implemented in software residing on other devices of the control system or in hardware. The moving average is calculated as follows:

$$(C_M + C_{M-1} + C_{M-2} + \ldots + C_{M+1-N})/N$$

wherein $C_M$ = the value of the command signal from the central controller as 12 as sampled by the motor controller 18 at a current point in time;

$C_{M-1}$ = the value of the command signal from the central controller 12 as sampled by the motor controller 18 one motor controller frame in the past (and so on for $C_{M-2}$, etc.); and N = an integer ratio of the motor control frame rate divided by the central controller 12 frame rate.

The quantity of the frames used for the moving average is equal to the integer value of the frame rate of the motor controller 18 divided by the frame rate of the central controller 12. Therefore, the frame rate of the motor controller 18 must be very close to an integer multiple of the frame rate of the central controller 12.

Figure 4:
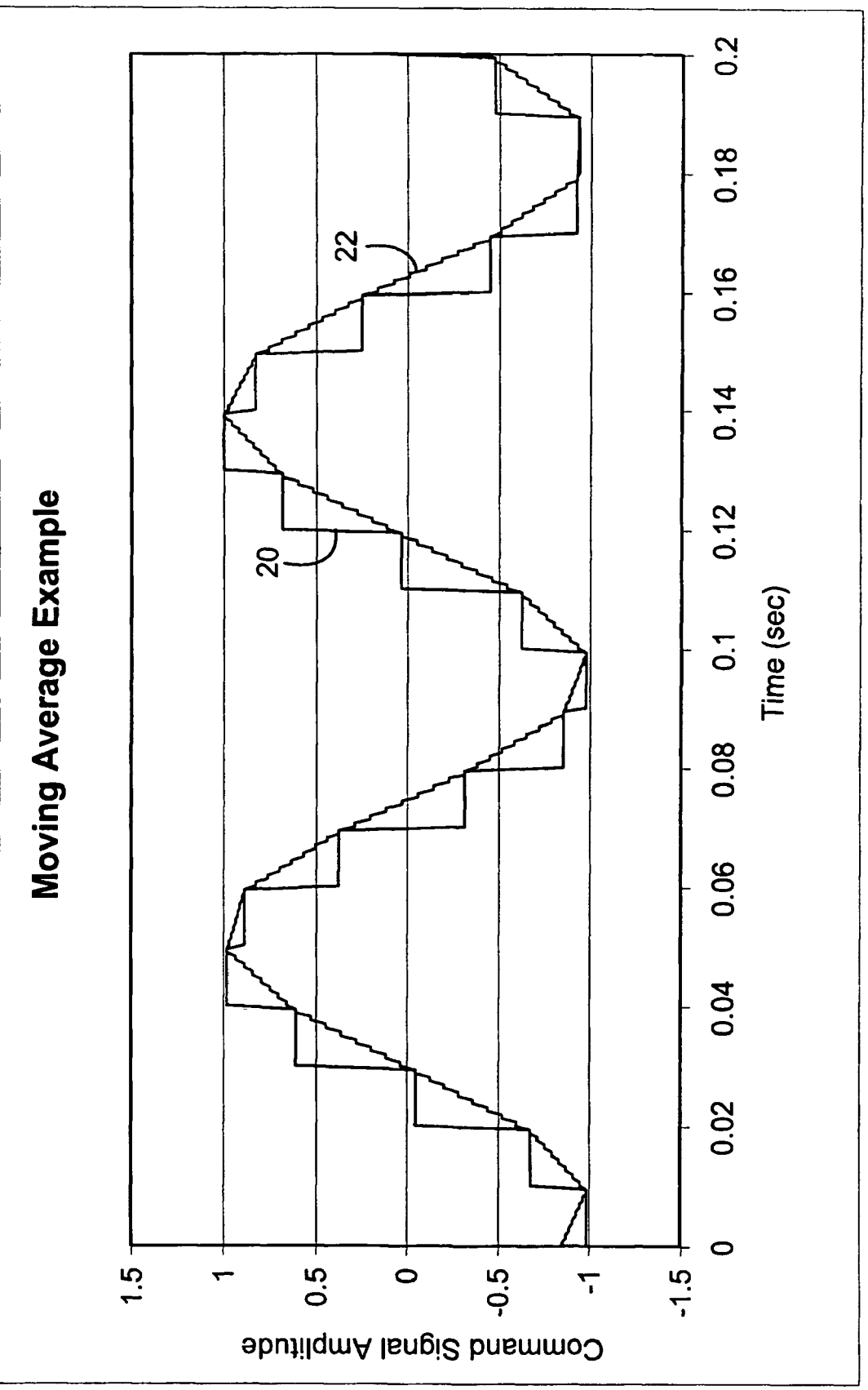
FIG. 4 is a graph comparing the command signal from the central controller of FIG. 1 in an unconditioned state to the command signal from the central controller of FIG. 1 as processed by the conditioning method of FIG. 2.

The moving average approach conditions the stair step command signal 20 of the central controller 12 as illustrated in FIG. 4. In this example, the frame rate of the central controller 12 was 100 frames per second, and the frame rate of the motor controller 18 was 800 frames per second. Applying the moving average approach of FIG. 2 to the command signal 20 resulted in the smooth waveform 22.

Figure 3:
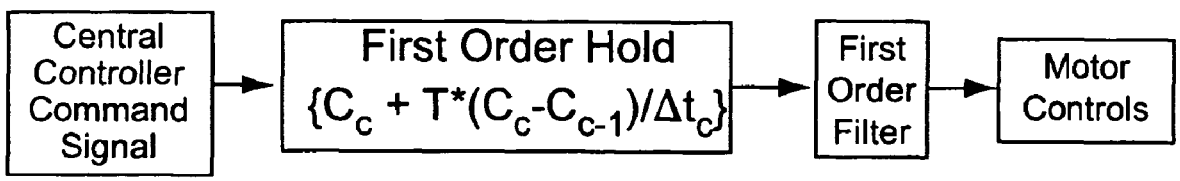
FIG. 3 is a block diagram of a method of command signal conditioning in accordance with another embodiment of the present disclosure.

In another embodiment as shown in FIG. 3, conditioning of the command signal is accomplished through the use of a slewer-filter approach. This approach will be hereinafter referred to as the slewer-filter approach. In this embodiment, conditioning of the command signal is accomplished through extrapolation of the command signal over a plurality of frames using a first order hold 24 and first order filter 26 combination. As with the moving average approach, this approach is preferably implemented in software residing on the motor controller 18. However, it can be appreciated that it can be implemented in software residing on other devices of the control system 10 or in hardware. In one embodiment, a first order filter is used with a slewer ranging between 100 Hz to 800 Hz. The filter frequency is selected to attenuate the high frequency gain increase introduced by the first order hold. A 17 Hz filter fulfills this criteria in this embodiment. It can be appreciated, however, that other criteria for selecting the filter frequency or higher order filters may be used depending on the dynamic characteristics of the system and/or the computational throughput capabilities of the motor control electronics.

The first order hold is a linear extrapolation using the last two commands from the central controller 12 with the starting point of the linear extrapolation being the most recent command. It is calculated as follows:

$$\{C_c + T^*(C_c - C_{c-1})/\Delta t_c\}$$

wherein T = the time from the most recent command from the central controller 12, updated at the motor controller 18 frame rate;

$\Delta t_c$ = the time between frames of the central controller 12;

$C_c$ = the most recent command from the central controller 12; and $C_{c-1}$ = the previous command from the central controller 12.

Figure 5:
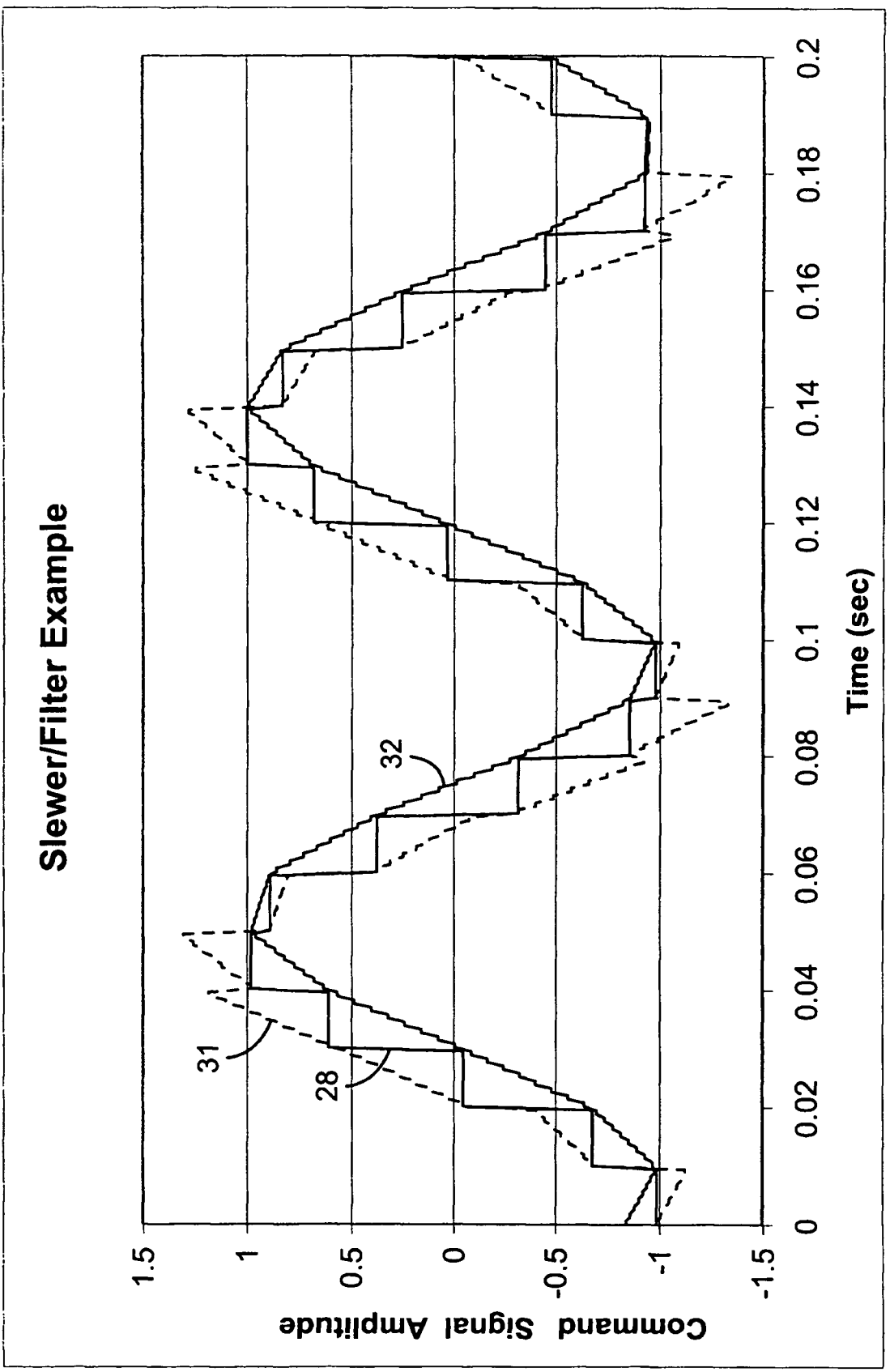
FIG. 5 is a graph comparing the command signal from the central controller of FIG. 1 in an unconditioned state to the command signal from the central controller of FIG. 1 as processed by the conditioning method of FIG. 3.
Figure 8A:
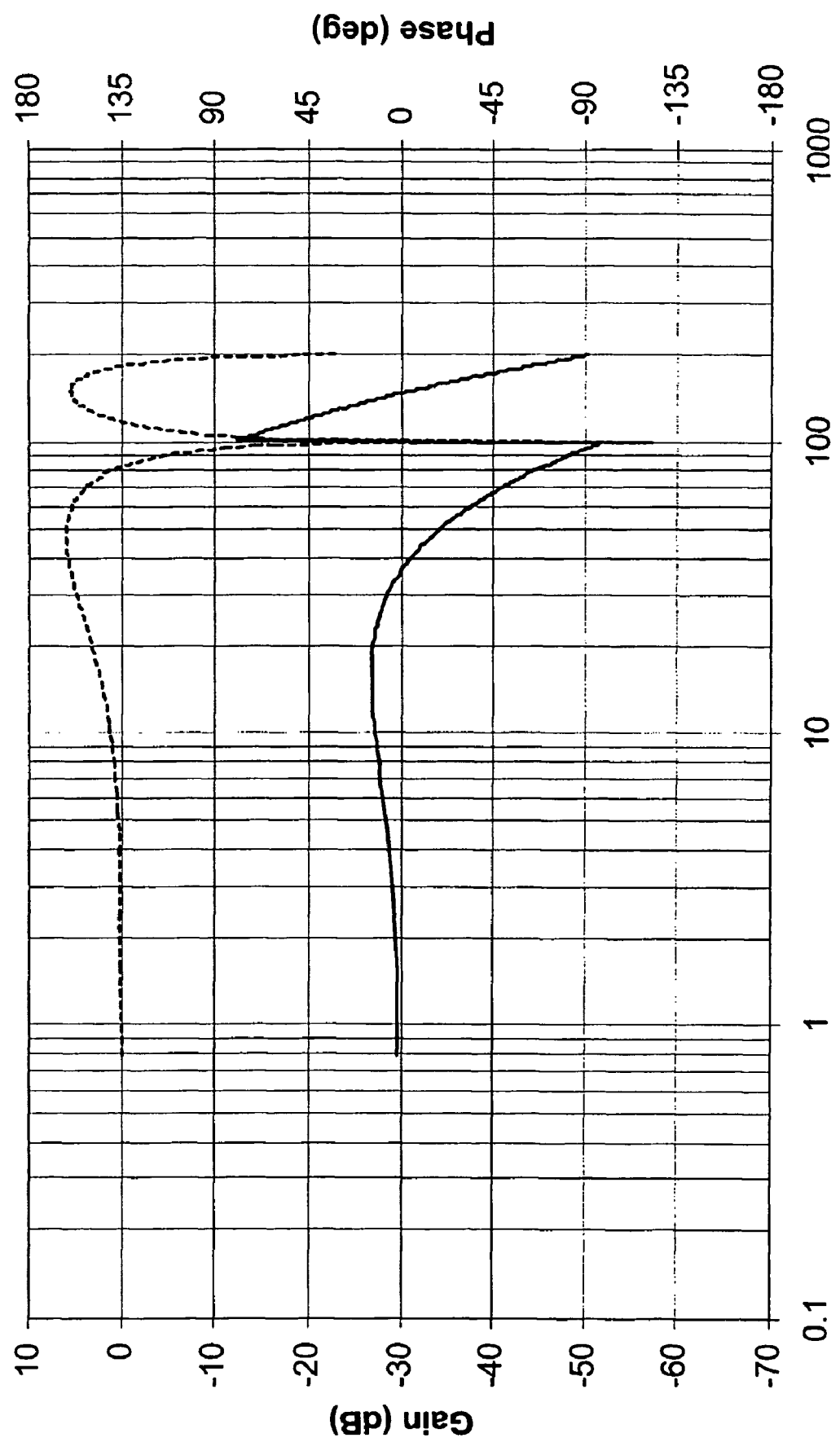
FIG. 8A is a graph showing the gain of the response of the digital control system of FIG. 3 without the first order filter of FIG. 3.
Figure 8B:
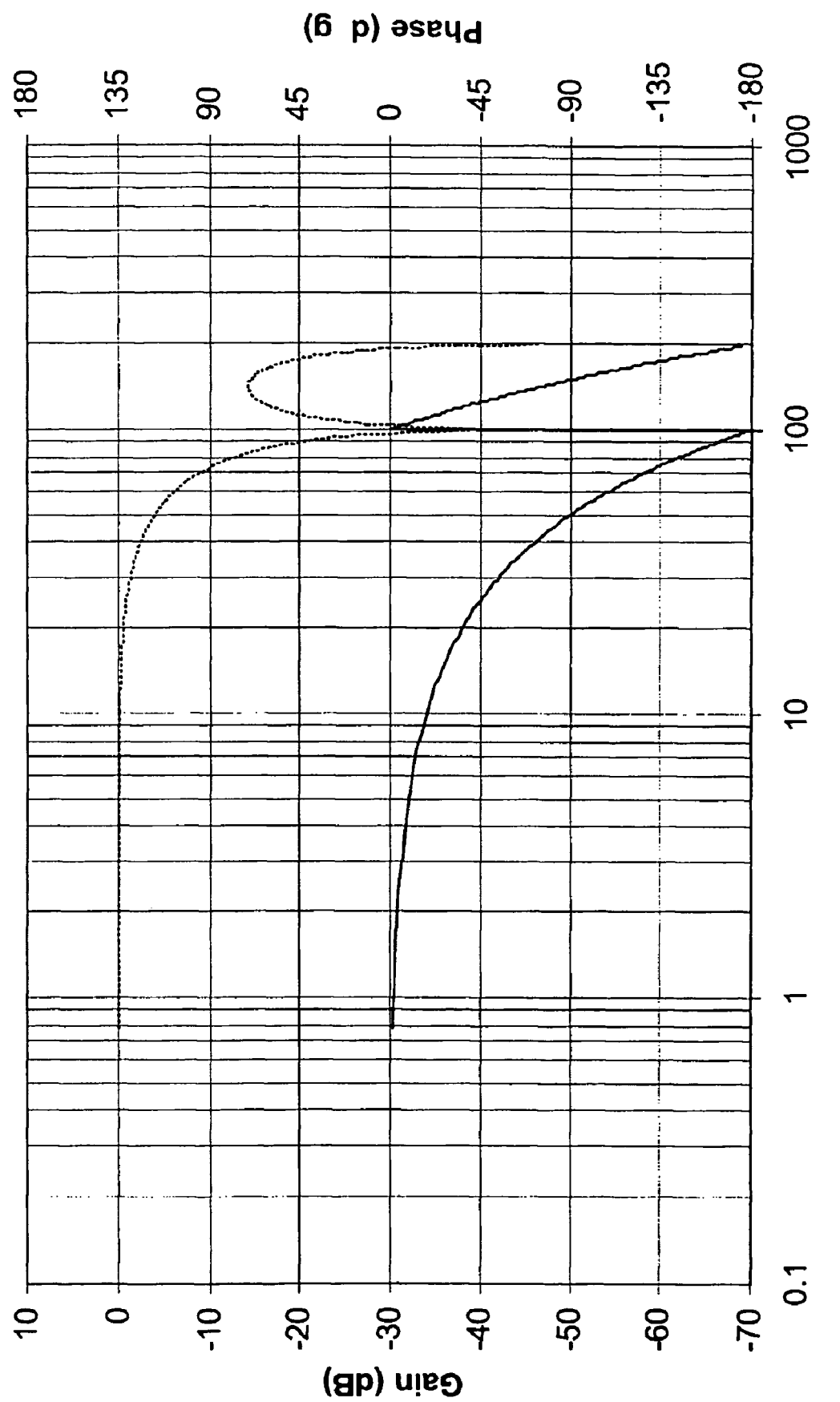
FIG. 8B is a graph showing the gain of the response of the digital control system of FIG. 3 with the first order filter of FIG. 3.

The slewer-filter approach adjusts the command signal as illustrated in FIG. 5. Specifically, the command signal 28 from the central controller 12 is conditioned by the first order hold as reflected by signal 31 and then filtered, resulting in the smoothed signal 32. The break point of the first order filter is preferably selected to negate the high frequency gain increase introduced by the extrapolation of the first order hold, thus maintaining near unity gain across the frequency range of the motion control system as illustrated in FIG. 8b. A graph of the gain without the use of a filter is shown in FIG. 8a. Unlike the moving average method, this method is applicable to motion control systems where the motor controller 18 frame rate is not an integer multiple of the central controller 12 frame rate.

This flexibility, however, requires more complex software and improved numerical precision to implement.

As shown in FIGS. 4 and 5, the signals 22 and 32 conditioned under the moving average approach and the slewer-filter approach, respectively, show only slight differences in amplitude, generally within thirty percent (30%) of the step change of the largest signal. The slewer-filter approach shows a slightly higher phase lag than the moving average approach, but this phase lag is no more than the zero order hold response of the control system without the slewer-filter approach. Moreover, this phase lag can be tuned by adjusting the filter frequency to trade off gain and phase to best meet the dynamic response and stability requirements of the overall control system 10.

Figure 6:
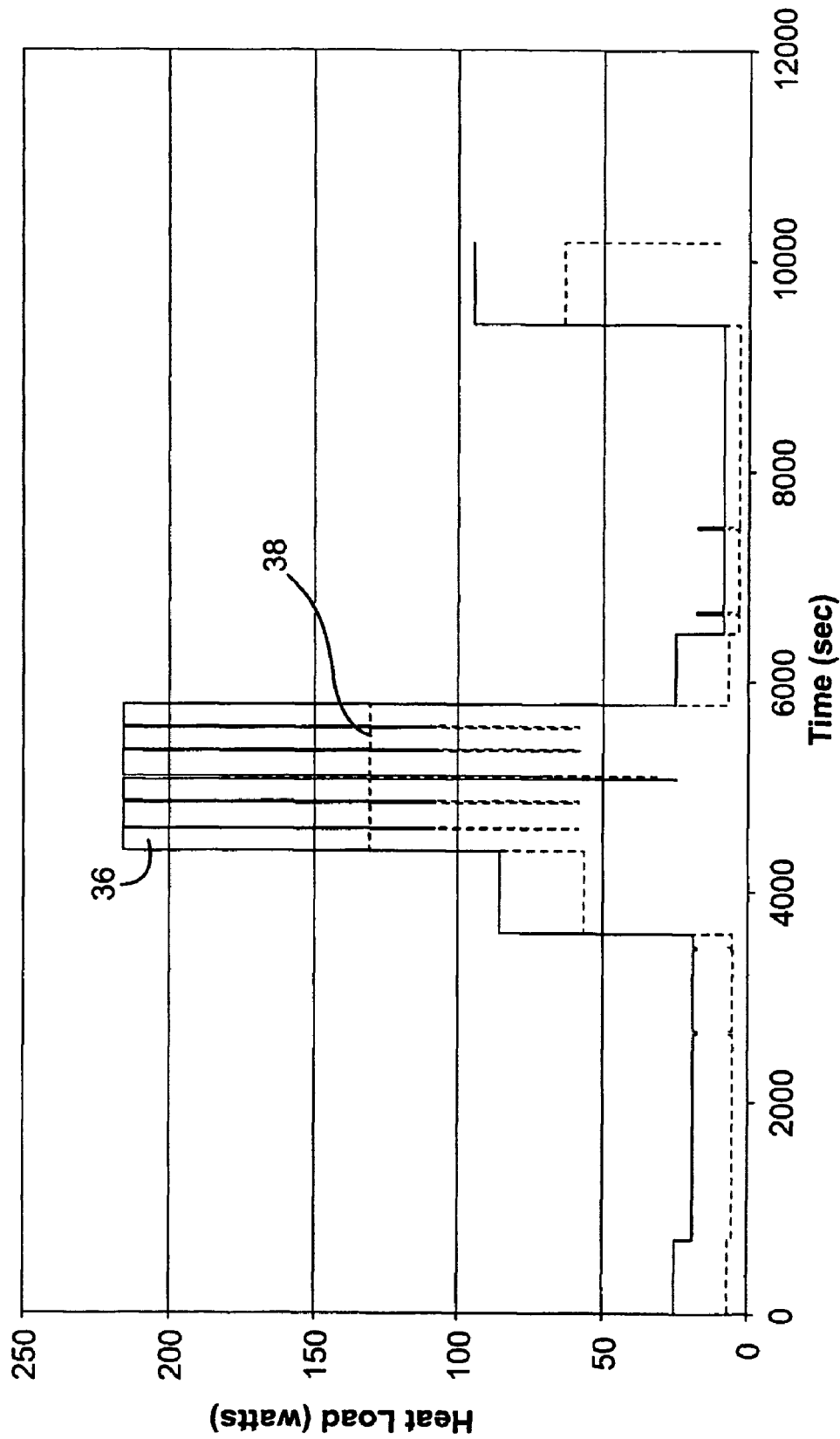
FIG. 6 is a graph comparing the heat load generated at the motor of FIG. 1 under a typical operation cycle using the digital control systems of FIGS. 2 and 3.
Figure 7:
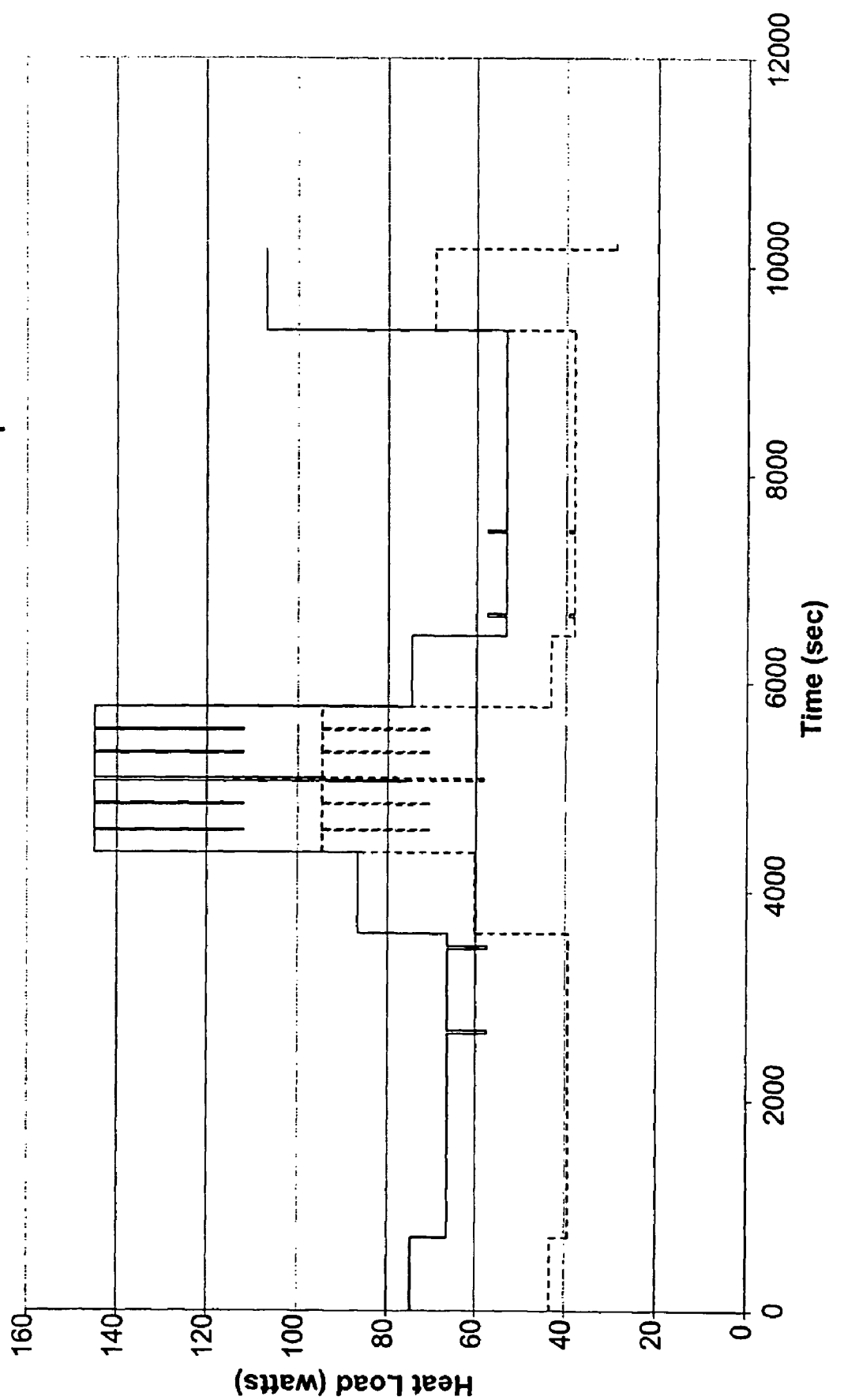
FIG. 7 is a graph comparing the heat load generated at the motor controller of FIG. 1 under a typical operation cycle using the digital control systems of FIGS. 2 and 3.

FIG. 6 illustrates the reduction in heat generation resulting from use of the present disclosure. Specifically, it compares the heat load generated by math models of a conceptual electromechanical actuator under a typical operation cycle. Graph 36 represents the heat load generated by the actuator without using either the moving average or slewer-filter approach. Graph 38 represents the heat load generated by the actuator using the moving average or slewer-filter approach. FIG. 7 compares the corresponding comparative heat loads at the motor controller 18 for the same actuator of FIG. 6.

This heat load data was input into a detailed thermal model of an aircraft and it was demonstrated that actuator and motor controller temperatures could be reduced significantly as shown in the following tables:

|  | No Filter | | 8 Point Average Filter | |
|---|---|---|---|---|
|  | Peak Temp. (° F.) | Peak Temp. (° C.) | Peak Temp. (° F.) | Peak Temp. (° C.) |
| Actuator | | | | |
| Winding | 409.4 | 209.7 | 298.5 | 148.1 |
| Stator | 343.0 | 172.8 | 276.3 | 135.7 |
| Housing | 274.9 | 135.0 | 235.8 | 113.2 |
| ACU | | | | |
| IGBT Module | 279.4 | 137.4 | 244.7 | 118.2 |
| Chassis | 219.6 | 104.2 | 204.8 | 96.0 |

By minimizing the need for additional cooling systems, This disclosure reduces the weight of products in which it is incorporated. In an aircraft, weight savings typically result in significant operational and support cost savings. Most importantly, however, mathematical simulations have shown that the present disclosure can significantly reduce waste energy and heat generation, in some cases by more than thirty percent (30%).

While the present disclosure has been described by reference to specific embodiments and specific uses, it should be understood that other configurations and arrangements could be constructed, and different uses could be made, without departing from the scope of the disclosure as set forth in the following claims. In particular, the disclosure can be used in any high response application.

What is claimed is:

1. A control system having a central digital controller having a digital controller frame rate and a command signal, a motor, and a motor controller in communication with the central digital controller and the motor, the motor controller having a motor controller frame rate higher than the digital controller frame rate, the control system comprising:

a signal conditioner adapted to condition the command signal so as to generate a modified command signal at the motor controller frame rate; and wherein the modified command signal is formed from one of:

the signal conditioner performing an interpolation of the command signal over a plurality of frames, and calculating a moving average at the frame rate of the motor controller; and the signal conditional performing a first order hold, and filtering the first order hold.

2. The control system of claim 1, wherein the signal conditioner comprises a computer readable medium having computer readable program code embodied thereon.

3. The control system of claim 2, wherein the computer readable code, when executed, calculates the moving average at the frame rate of the motor.

4. The control system of claim 1, wherein the filtering is performed by a filter comprising a first order filter.

5. The control system of claim 4, wherein:

the filter has a breakpoint; and the breakpoint is selected to negate any high frequency gain increase introduced by the first order hold.

6. The control system of claim 1 wherein the first order hold comprises a linear extrapolation of the command signal of the digital controller over a plurality of frames.

7. The control system of claim 6, wherein the linear extrapolation comprises the use of the last two command signals of the digital controller and has a starting point being the most recent command signal of the digital controller.

8. The control system of claim 1, wherein the computer readable medium is stored on the motor controller.

9. An apparatus comprising:

a computer readable medium having computer readable program code embodied thereon, the computer readable program code, when executed, conditioning a command signal generated by a central digital controller having a digital controller frame rate prior to its application to a motor controller having a motor controller frame rate higher than the digital controller frame rate, and modifying the command signal to produce a modified command signal at the motor controller frame rate; and wherein modifying the command signal comprises one of:

interpolating the command signal over a plurality of frames; and linearly extrapolating the command signal from the digital controller over a plurality of frames and filtering the linearly extrapolated command signal.

10. The apparatus of claim 9, wherein the conditioning comprises calculating a moving average at the frame rate of the motor controller.

11. A control system, comprising:

a central digital controller having a command signal and a digital controller frame rate;

a motor controller having a motor controller frame rate higher than the digital controller frame rate; and a signal conditioner adapted to condition the command signal to produce a modified command signal at the motor controller frame rates the signal conditioner adapted to produce the modified command signal by one of:

an interpolation of the command signal over a plurality of frames; and performing a first order hold and filtering the first order hold.

12. The control system of claim 11, wherein the signal conditioner comprises a computer readable medium having computer readable program code embodied thereon.

13. The control system of claim 12, wherein the computer readable code, when executed, calculates a moving average at the frame rate of the motor controller.

14. The control system of claim 12, wherein the computer readable medium is stored on the motor controller.

15. The control system of claim 11, wherein the filtering is accomplished by implementing a first order filter.

16. The control system of claim 11, wherein the first order hold comprises a linear extrapolation of the command signal over a plurality of frames.

17. The control system of claim 16, wherein the linear extrapolation comprises the use of the last two command signals of the digital controller and has a starting point being the most recent command signal of the digital controller.

18. The control system of claim 11, wherein the filtering is accomplished through the use of a filter having a breakpoint, and wherein the breakpoint is selected to negate a high frequency gain increase introduced by the linear extrapolation.

19. A method of conditioning a command signal generated by a central digital controller having a digital controller frame rate prior to its application to a motor controller having a motor controller frame rate higher than the digital controller frame rate, the method comprising:
 conditioning the command signal to produce a modified command signal at the motor controller frame; and
 performing the conditioning of the command signal by one of:
  interpolating the command signal over a plurality of frames; and
  linearly extrapolating the command signal of the digital controller over a plurality of frames and filtering the linearly extrapolated command signal.

20. The method of claim 19, wherein said interpolating the command signal over a plurality of frames comprises calculating a moving average at the frame rate of the motor controller.

21. The method of claim 19, wherein said filtering comprises selecting a breakpoint to negate a high frequency gain increase introduced by said linear extrapolation.

* * * * *